United States Patent [19]

Cassidy et al.

[11] Patent Number: 4,750,765
[45] Date of Patent: Jun. 14, 1988

[54] QUICK-CONNECT COUPLING

[75] Inventors: John A. Cassidy, Azle; Rodney L. Huston, Springtown; James W. Konecy, Fort Worth, all of Tex.

[73] Assignee: Stratoflex, Inc., Fort Worth, Tex.

[21] Appl. No.: 78,262

[22] Filed: Jul. 27, 1987

[51] Int. Cl.⁴ ............................................. F16L 39/00
[52] U.S. Cl. ..................................... 285/321; 265/351; 265/354; 265/924
[58] Field of Search ............... 285/321, 233, 276, 403, 285/924, 354, 351

[56] References Cited

U.S. PATENT DOCUMENTS

| | | | |
|---|---|---|---|
| 2,521,127 | 9/1950 | Price | 285/321 X |
| 3,304,104 | 2/1967 | Wiltse | 285/321 X |
| 3,540,760 | 11/1970 | Miller . | |
| 3,847,421 | 11/1974 | Eschbaugh . | |
| 4,055,359 | 10/1977 | McWethy . | |
| 4,063,760 | 12/1977 | Moreiras | 285/321 X |
| 4,133,564 | 1/1974 | Sarson et al. | 285/321 |
| 4,135,745 | 1/1979 | Dehar . | |
| 4,193,616 | 3/1980 | Sarson . | |
| 4,278,276 | 7/1981 | Ekman . | |
| 4,294,473 | 10/1981 | Edman . | |
| 4,401,326 | 8/1983 | Blair . | |
| 4,471,978 | 9/1984 | Kramer . | |
| 4,632,434 | 12/1986 | Proctor . | |
| 4,635,975 | 1/1987 | Campbell . | |
| 4,653,781 | 3/1987 | Sheets . | |

FOREIGN PATENT DOCUMENTS

| | | | |
|---|---|---|---|
| 2603566 | 8/1976 | Fed. Rep. of Germany | 285/321 |
| 202253 | 2/1966 | Sweden | 285/354 |

Primary Examiner—Dave W. Arola
Attorney, Agent, or Firm—Marshall, O'Toole, Gerstein, Murray & Bicknell

[57] ABSTRACT

A releasable quick-connect coupling comprises tubular nipple and socket parts. The nipple is formed by a metal tube and a sleeve on the outer periphery of the tube, the sleeve being retained by beads formed on the tube. A locking ring is mounted in an annular groove formed in the sleeve. The socket includes a tubular adapter and a nut threaded on one end of the adapter. An annular lock groove is formed between the nut and the adjacent end of the adapter, and the groove receives the outer periphery of the locking ring when the parts are assembled. A seal is provided between the adapter and the tube. To disassemble the coupling, the nut is first partially unthreaded from the adapter to release the seal and thereby equalize the pressure. Then the nut is completely unthreaded, thereby releasing the locking ring and the nipple. The locking ring may be removed from the sleeve so that the nut may be removed from the nipple.

5 Claims, 2 Drawing Sheets

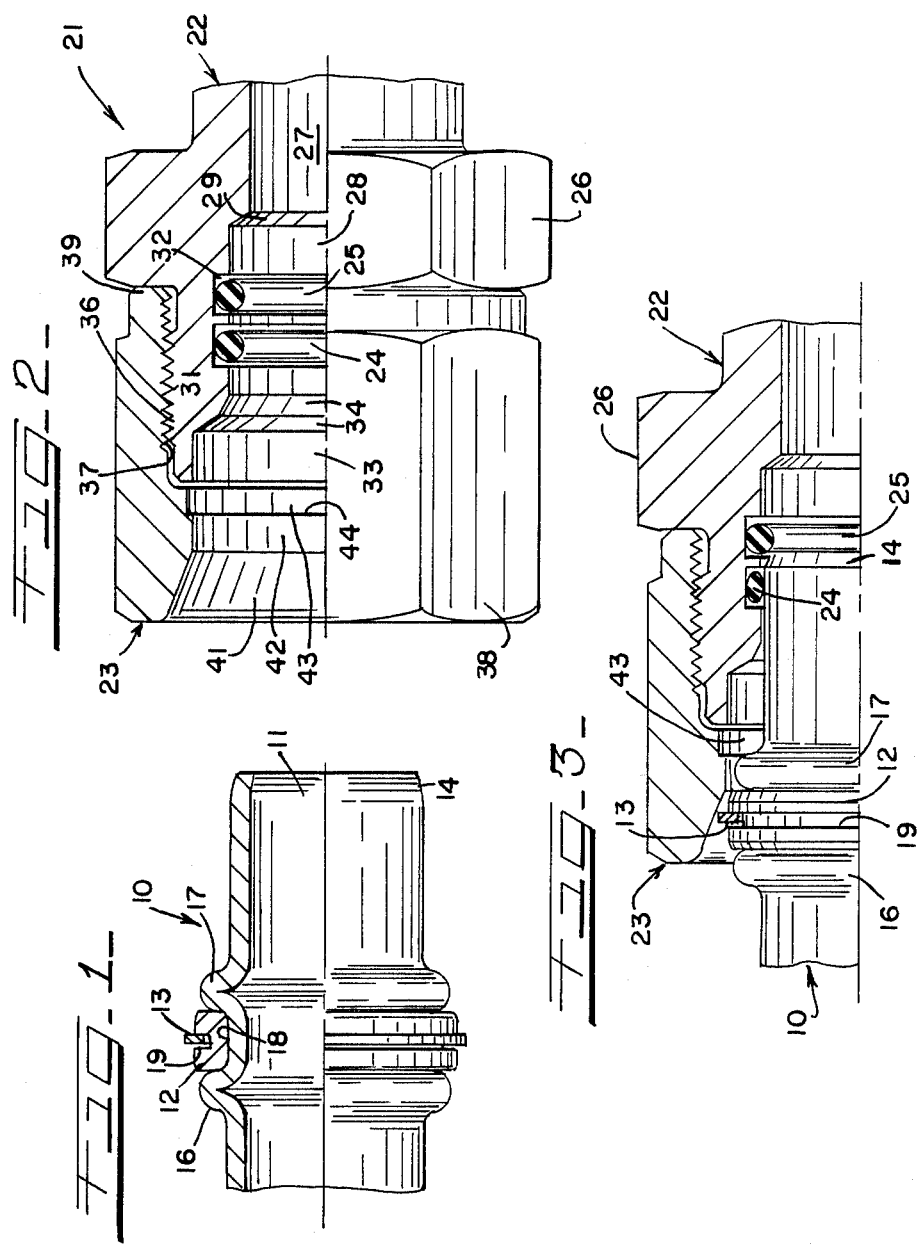

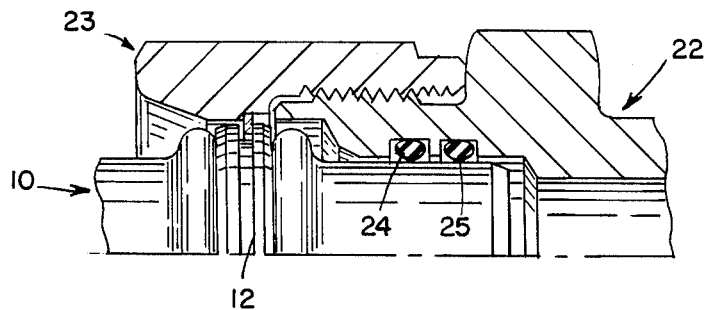
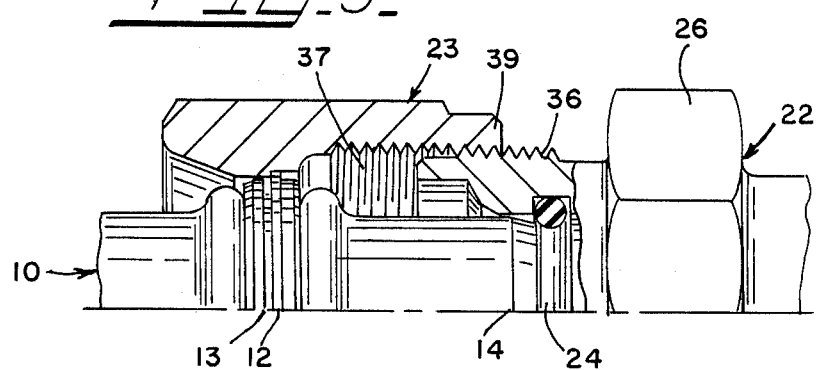
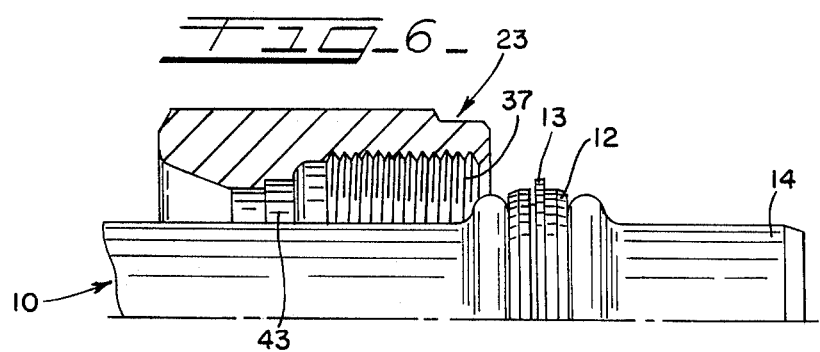

QUICK-CONNECT COUPLING

FIELD AND BACKGROUND OF THE INVENTION

This invention relates to a quick-connect coupling for use in hydraulic, pneumatic and/or vacuum systems, the coupling having a disconnect feature.

Quick-connect fittings are well known in the art, and one such design is described in G. N. Vyse U.S. Pat. No. 4,565,392 dated January 21, 1986. Fittings of this type usually include a nipple or insert part which, during assembly, is inserted into a bore of a socket or receptacle part, and an expansible or contractable locking ring which extends across annular grooves of the two parts in order to secure them together.

Quick-connect fittings have also been provided which include means for enabling the two parts to be disassembled when desired. For example, U.S. Pat. No. 3,540,760 and No. 4,063,760 describe fittings including screw-on sleeves or nuts which, when removed from the other parts, release the locking ring and thereby enable the fittings to be disassembled.

U.S. Pat. No. 4,133,564 and No. 4,193,616 show quick connect couplings wherein the insert part is formed by a metal tube, and a locking ring is carried by the tube. The couplings shown in these two patents further include nuts which may be removed in order to disassemble the couplings.

It is a general object of the present invention to provide an improved quick-connect fitting having a disconnect feature and an insert part formed by a metal tube.

SUMMARY OF THE INVENTION

A releasable quick-connect coupling in accordance with the present invention comprises tubular nipple and socket parts. The nipple is formed by a metal tube and a sleeve on the outer periphery of the tube, the sleeve being retained by beads formed on the tube. A locking ring is mounted in an annular groove formed in the sleeve. The socket includes a tubular adapter and a nut threaded on one end of the adapter. An annular lock groove is formed between the nut and the adjacent end of the adapter, and the groove receives the outer periphery of the locking ring when the parts are assembled. A seal is provided between the adapter and the tube. To disassemble the coupling, the nut is first partially unthreaded from the adapter to release the seal and thereby equalize the pressure. Then the nut is completely unthreaded, thereby releasing the locking ring and the nipple. The locking ring may be removed from the sleeve so that the nut may be removed from the nipple.

BRIEF DESCRIPTION OF THE DRAWINGS

The foregoing and other objects and advantages of the present invention will be apparent from the following detailed description taken in conjunction with the accompanying figures of the drawings, wherein:

FIG. 1 is a fragmentary sectional view of a coupling in accordance with this invention;

FIG. 2 a fragmentary sectional view of a socket of the coupling;

FIG. 3 is a fragmentary sectional view showing the nipple partially assembled with the socket;

FIG. 4 is a fragmentary sectional view showing the nipple and socket fully assembled;

FIG. 5 is a fragmentary sectional view showing partial disassembly of the nipple from the socket; and FIG. 6 is a view of the nipple disconnected from the socket.

DETAILED DESCRIPTION OF THE DRAWINGS

With reference first to FIG. 1, the nipple 10 is comprised of a tubular insert 11, a sleeve 12 and a locking ring 13. The tubular insert 11 is formed from a piece of straight thin-walled tubing, and the forward end 14 (toward the right) of the insert 11 is preferably curved or turned inwardly as indicated at 14 in order to facilitate assembly as will be described. Two annular outwardly projecting beads or rings 16 and 17 are formed on the tubular insert 11 at locations which are spaced from the forward end 14. The beads are formed by bumping or deforming portions of the tubular insert 11 radially outwardly. The two beads 16 and 17 are axially spaced from each other and the sleeve 12 is located in the space 18 between the two beads. The insert may be fabricated, for example, by first forming the bead 16 by a conventional bumping process, and then sliding the sleeve 12 over the forward end of the tubular insert and moving it tightly against the bead 16. The second bead 17 is then formed by a similar bumping operation and it is tight against the sleeve 12, whereby the annular sleeve 12 is secured against axial movement on the tubular insert 11. As shown in FIG. 1, the bumping operation deforms the bead portions of the insert 11 radially outwardly so that restrictions to internal flow are not formed within the tubular insert 11.

The sleeve 12 is an annular member and has an annular groove 19 formed in its outer periphery. The annular locking ring 13 is mounted in the groove 19, the ring 13 being split so that it may be contracted or expanded. In the normal untensioned size of the ring 13, the inner periphery of the ring 13 is spaced from the bottom of the groove 19, whereby the locking ring 13 may have its diameter contracted to permit assembly of the coupling as will be described hereinafter. The axial width of the groove 19 is slightly greater than the axial thickness of the ring 13 so that the ring 13 is free to move in the groove 19. The ring 13 may be formed, for example, from high carbon spring steel. The tubular insert 11 and the sleeve 12 may be formed from various metals, such as mild steel. The outer surface of the forward end portion of the insert is preferably treated (polished) so that it forms a good seal with the 0-rings of the socket 21.

The socket 21, illustrated in FIG. 2, comprises an adapter 22, a nut 23, and two 0-rings 24 and 25. The adapter 22 has a tubular configuration and wrench flats 26 are formed on an enlarged portion of the outer periphery of the adapter. Adjacent the forward (toward the right as seen in FIG. 2) end of the adapter 22, the inner periphery 27 has an internal diameter which is substantially equal to the internal diameter of the tubular insert 11. A larger diameter portion 28 is provided internally of the adapter 22 and this portion 28 has an internal diameter which is slightly larger than the outer diameter of the tubular insert 11. A stop or abutment surface 29 is formed between the two diameter portions 27 and 28. A pair of axially spaced grooves 31 and 32 are formed in the larger diameter portion 28, and the two 0-rings 24 and 25 are mounted in the grooves 31 and 32, respectively. Rearwardly from the larger diameter portion 28 is formed a cavity 33 which has a larger diameter than the portion 28, and slanted surfaces 34 connect the cavity 33 with the larger diameter portion 28. The diameter of the cavity 33 is slightly larger than the outer diameter of the bead 17 so that the bead 17 may be received within the cavity 33 when the coupling is fully assembled as shown in FIG. 4.

Rearwardly of the wrench flats 26 of the adapter 22 is formed a reduced diameter threaded portion 36 on the outer periphery of the adapter 22. The nut 23 has an internally threaded portion 37 which may be screwed onto the threaded portion 36. The outer periphery of the nut 23 has wrench flats formed thereon as indicated by the numeral 38. The threads 36 and 37 are sufficiently long in the axial direction that the forward end 39 of the nut 23 engages the enlarged part 26 of the adapter 22 when the nut is fully threaded onto the adapter 22. At the rearward end of the nut 23, the inner periphery has a radially inwardly sloped portion 41 which narrows the opening down to a smaller diameter portion 42 which extends substantially axially. At the forward end of the smaller diameter portion 42, the diameter of the interior surface of the nut 23 increases and forms a lock groove 43, a ledge 44 being formed between the lock groove 43 and the smaller diameter portion 42. As shown in FIG. 2, when the nut 23 is assembled on the adapter 22, the diameter of the portion 42 is substantially equal to the diameter of the cavity 33 whereas the lock groove 43 is greater than the smaller diameter. With reference to FIGS. 3 and 4, it will be noted that the diameter of the lock groove 43 is substantially equal to the outer diameter of the locking ring 13 when the ring 13 is in its unstressed or normal shape. Further, the diameters of the portions 42 and 33 are smaller than the normal diameter of the locking ring 13. However, the locking ring 13 may be contracted to an outer diameter equal to the small diameter portion 42.

The coupling is particularly suited for use in an air conditioning system of, for example, a vehicle such as an automobile or truck. The left end of the tubular insert 11 may be connected to a suitable component of such a system, and the right-hand end of the adapter 22 is also connected to a different part of the system. In use, a refrigerant under pressure flows through the internal passages formed by the tubular insert 11 and the adapter 22.

In use, the nipple 10 is constructed as previously described and the locking ring 13 is mounted in the groove 19 of the sleeve 12. The nut 23 is threaded onto the adapter 22 of the socket 21 and the 0-rings 24 and 25 are mounted in the grooves 31 and 32. It may be convenient to mount the 0-rings prior to threading the nut 23 onto the adapter 22. With the parts in the position shown in FIGS. 1 and 2, the tubular insert 11 is pressed into the bore of the adapter 22. The curved forward end 14 of the tubular insert 11 compresses the two 0-rings 24 and 25 slightly as shown in FIG. 3 during such assembly, and a good seal is formed between the 0-rings and the insert 11. The locking ring 13 engages the sloped or slanted portion 41 during assembly and the slanted surface causes the locking ring to contract as shown in FIG. 3. The locking ring contracts to the point where its outer diameter is equal to the small diameter portion 42 of a nut 23 and the locking ring slides past the surface 42 and snaps outwardly to its normal size when the locking ring reaches the lock groove 43. The position of the parts shown in FIG. 4 is the fully assembled position, and it will be noted that the locking ring 13 is retained between the ledge 44, and the rearward end of the adapter 22. The 0-rings 24 and 25, of course, form a seal between the adapter 22 and the surface 46 of the tubular insert 11, and in this assembled condition the refrigerant under pressure may be introduced into the tubular insert and the adapter.

In the event it is desired to disassemble the coupling for any reason, it is preferable to release the internal pressure before fully disassembling the parts. To accomplish this, the nut 23 is first partially unthreaded to the position shown in FIG. 5, where the forward end 14 of the tubular insert 11 is moved rearwardly relative to the adapter 22 and disengages from the two 0-rings 24 and 25. The distance from the forward end of the insert to the seal 25 is greater than the length of the threads 36 and 37. Consequently, while the ledge 44 of the nut 23 still retains the tubular insert 11 in assembly with the adapter 22, the threaded portions of the nut and the adapter are sufficiently long that the seal is lost and internal pressure escapes between the 0-rings and the forward end 14 of the tubular insert 11. This engagement of the threads prevents the two parts of the coupling from being blown apart by the internal pressure and possibly injuring a technician or damaging other parts.

Once the internal pressure has been released while in the position shown in FIG. 5, the nut 23 is completely unscrewed and the tubular insert 11 is removed from the adapter 22. As shown in FIG. 6, the nut 23 is still retained over the tubular insert 11 because the locking ring 13 has a greater diameter than the small diameter portion 42 of the nut 23. However, the nut 23 may be moved rearwardly away from the sleeve 12 in order to expose the locking ring 13. The locking ring 13 may then be manually removed from the groove 19 at which time the nut 23 may be slipped off of the tubular insert by sliding it over the top of the sleeve 12. In some instances, it may not be necessary to remove the nut 23 from the tubular insert. The nut may be left in the position shown in FIG. 6 and later the parts may be reassembled simply by moving the tubular insert back into the adapter 22 and threading the nut 23 onto the adapter to once again obtain the position of the parts shown in FIG. 4.

It will be apparent from the foregoing that a novel and useful structure has been provided. A quick connect fitting having a releasable feature is provided in combination with a tubular insert formed by a thin-walled metal tube. The locking ring is carried by the tube but, contrary to the prior art, the mounting of the locking ring does not constrict the size of the flow passage through the insert part, nor does it weaken the tube.

We claim:

1. A quick-connect coupling comprising tubular insert, adapter and nut parts, said insert part comprising a thin-walled round metal tube, said tube having a forward end, inner and outer surfaces, an annular sleeve positioned on said outer surface of said tube and spaced from said forward end thereof said annular sleeve having a radial outer surface, , said tube having at least one deformation which extends radially outwardly into engagement with said sleeve, said deformation preventing said sleeve from moving axially on said tube, said sleeve having an annular groove in its radially outer surface, a radially expansible/contractible, locking ring carried in said annular groove, said ring having an outer peripherial portion said adapter having a cylindrical passage therethrough and said tube extending into said passage, said nut being positioned around said tube and threaded to said adapter, said adapter and said nut provided with means forming an annular lock groove therebetween, said lock groove receiving an outer peripheral portion of said ring and thereby holding said tube assembled with said adapter, and seal means between said tube and said adapter and in sealing engagement therewith, said seal means being located between said sleeve and said forward end, the distance from said forward end to said seal means being greater than the length of said threaded portions.

2. Apparatus according to claim 1, wherein said deformation includes at least one outwardly extending bead which does not reduce the flow area through said tube.

3. Apparatus according to claim 2, wherein said deformation includes beads on opposite sides of said sleeve.

4. Apparatus according to claim 1, wherein said seal means comprises two axially spaced 0-rings.

5. Apparatus according to claim 4, wherein said adapter has two 0-ring grooves formed in the inner periphery thereof, and said 0-rings are mounted in said 0-ring grooves.

* * * * *